United States Patent
Hodge et al.

(10) Patent No.: US 6,711,337 B2
(45) Date of Patent: Mar. 23, 2004

(54) CABLE SPLICE ENCLOSURE AND COMPONENTS

(75) Inventors: Ronald L. Hodge, Flowery Branch, GA (US); Paul E. Bebout, Marietta, GA (US); James O. Farmer, Lilburn, GA (US)

(73) Assignee: Wave7 Optics, Inc., Alpharetta, GA (US)

( * ) Notice: Subject to any disclaimer, the term of this patent is extended or adjusted under 35 U.S.C. 154(b) by 0 days.

(21) Appl. No.: 10/045,439

(22) Filed: Nov. 7, 2001

(65) Prior Publication Data

US 2002/0181925 A1 Dec. 5, 2002

Related U.S. Application Data

(60) Provisional application No. 60/291,953, filed on May 21, 2001.

(51) Int. Cl.$^7$ ................................................ G02B 6/00
(52) U.S. Cl. ..................................... 385/135; 385/136
(58) Field of Search .............................. 385/135, 136, 385/100; 174/40 CC, 135, 65 R, 65 SS, 65 G, 60

(56) References Cited

U.S. PATENT DOCUMENTS

| | | | | |
|---|---|---|---|---|
| 4,295,005 A | * | 10/1981 | Daugherty et al. ............ 174/92 |
| 4,805,979 A | * | 2/1989 | Bossard et al. | |
| 5,189,725 A | * | 2/1993 | Bensel et al. ................ 385/135 |
| 5,313,546 A | * | 5/1994 | Toffetti ........................ 385/135 |
| 5,378,174 A | * | 1/1995 | Brownlie et al. ........... 439/709 |
| 5,402,315 A | * | 3/1995 | Reichle ..................... 174/40 CC |
| 5,495,549 A | * | 2/1996 | Schneider et al. .......... 385/135 |
| 5,509,099 A | * | 4/1996 | Hermsen et al. ............ 385/134 |
| 5,731,546 A | * | 3/1998 | Miles et al. ................. 174/135 |
| 6,215,939 B1 | * | 4/2001 | Cloud ......................... 385/135 |
| 6,300,562 B1 | * | 10/2001 | Daoud ........................ 174/50 |
| 6,496,641 B1 | * | 12/2002 | Mahony ...................... 385/135 |
| 6,621,975 B2 | * | 9/2003 | Laporte et al. ............. 385/135 |

* cited by examiner

*Primary Examiner*—Mike Stahl
(74) *Attorney, Agent, or Firm*—King & Spalding LLP

(57) ABSTRACT

An enclosure for facilitating and protecting splices or connections between communication transmission mediums can include a housing having a first port and a drop port. The first port can allow a distribution cable containing a transmission medium to enter the housing. The drop port can allow another transmission medium to enter the housing, and it can allow a transmission medium to be added or removed without disturbing existing transmission mediums or connections in the housing. A drop plug can be provided to seal the drop port. The enclosure can also include a cover plate having a gasket coupled to its perimeter and being removable with the cover plate. Strain relief for the transmission mediums entering the enclosure can also be provided. Two-stage strain relief and single-stage strain relief can be provided for the transmission mediums entering through the first port and the drop port, respectively.

30 Claims, 10 Drawing Sheets

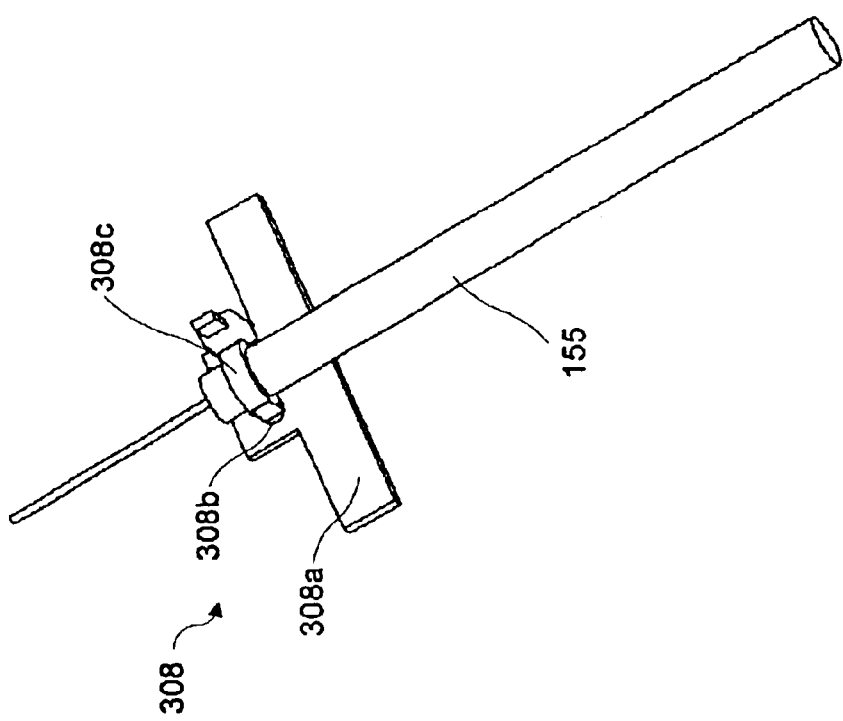

CABLE SPLICE ENCLOSURE AND COMPONENTS

CROSS-REFERENCE TO RELATED APPLICATIONS

This application claims the benefit of priority to U.S. Provisional Application Ser. No. 60/291,953, entitled "Optical Fiber Enclosure Useful to Provide Voice and Data Services," filed May 21, 2001. This application is related to U.S. Provisional Application Serial No. 60/237,894, entitled "Systems to Provide Video, Voice and Data Services Via Fiber Optic Cable," filed Oct. 4, 2000; U.S. Provisional Application Serial No. 60/244,052, entitled "Systems to Provide Video, Voice and Data Services Via Fiber Optic Cable—Part 2," filed Oct. 26, 2000; U.S. Provisional Application Serial No. 60/258,837, entitled "Systems to Provide Video, Voice and Data Services Via Fiber Optic Cable—Part 3," filed Dec. 28, 2000; U.S. Non-Provisional application Ser. No. 09/899,410, entitled "System and Method for Communicating Optical Signals Between a Data Service Provider and Subscribers," filed Jul. 5, 2001; and U.S. Non-Provisional application Ser. No. 09/971,363, entitled "System and Method of Communicating Optical Signals Upstream and Downstream Between a Data Service Provider and Subscribers," filed Oct. 4, 2001. The disclosure of the priority document and each of the related documents is hereby fully incorporated by reference.

BACKGROUND OF THE INVENTION

1. Field of the Invention

The present invention relates to video, voice, and data communications. More particularly, the present invention relates to an enclosure for facilitating and protecting splices and connections in communication networks.

2. Description of the Related Art

When communication services are provided to homes and businesses, many cable splices and connections are needed between the provider and the subscriber. In a typical communication distribution system, a distribution cable can carry communication signals to and from the provider. Individual subscriber drop lines can be spliced from the distribution cable to provide the communication services to each individual subscriber. Where such splices or connections are made, an enclosure is typically used to protect these structures from physical damage and environmental elements, such as moisture, dirt, etc.

The distribution cable and the drop lines are transmission mediums for the communication services. Such transmission mediums can comprise optical waveguides, coaxial cables, telephone cables, electrical wires, and other like waveguides or devices. As used throughout this specification, the term "optical waveguide" denotes an optical fiber, a planar light guide circuit, a fiber optic pigtail, and other optical waveguides. A typical distribution cable can comprise one or more individual transmission mediums bundled together. Each individual transmission medium of the distribution cable can provide services to a limited number of subscribers. Typically, each individual transmission medium of the distribution cable is spliced or connected to one or more individual drop lines.

Conventional enclosures can protect the splices or connections of the transmission mediums in the communication distribution system. Such enclosures can have a first port, which allows a first portion of the distribution cable and drop lines to enter the enclosure. Additionally, conventional enclosures can have a second port, which allows a second portion of the distribution cable and drop lines to enter the enclosure. Inside the enclosure, an individual transmission medium of the distribution cable can be spliced or connected to one or more drop lines. Additionally, individual transmission mediums of the distribution cable can be spliced or connected to each other.

Conventional enclosures usually suffer from a number of deficiencies. For example, the distribution cable and individual drop lines enter the enclosure through the same first and second ports. Accordingly, existing drop lines and existing transmission mediums of the distribution cable must be disturbed each time a new drop line or distribution cable is added to, or removed from, the enclosure. Such a disturbance can damage existing splices or connections or both, thereby disrupting the services provided to the subscribers.

Additionally, conventional enclosures typically contain a loose-fitting gasket between a housing of the enclosure and a removable cover plate. The cover plate can be removed from the enclosure to provide access for working in the enclosure. When the cover plate is removed, the loose-fitting gasket usually must also me removed and handled carefully to protect it from physical damage and environmental elements. If care is not exercised, the loose-fitting gasket can be dropped when the cover plate is removed, thereby damaging the gasket or exposing it to harmful environment elements such as dirt. Furthermore, because the gasket is loose-fitting, it typically must be manually held in place when the cover plate is being reattached to the housing. During attachment, a gap can sometimes be created between the cover plate and the gasket or between the gasket and the housing. The gap can allow external environmental elements such as moisture or dirt to enter the enclosure and damage the splices contained therein. Additionally, when the enclosure is mounted such that the cover plate and gasket are in a vertical position, holding the gasket in place while attaching the cover plate to the housing can be a difficult task.

Another problem of conventional enclosures can be associated with the strain relief device, which holds individual drop lines in the enclosure. A conventional strain relief device 700 is illustrated in FIGS. 7A and 7B. Strain relief device 700 typically comprises a support member 702. Support member 702 can be attached to a conventional enclosure (not shown). Support member 702 can have notches 704 for receiving a clamp 708 after clamp 708 is tightened. Clamp 708 can attach an individual drop line 706 to support member 702. However, notches 704 typically do not hold clamp 708 in place before clamp 708 is tightened. Clamp 708 can fit loosely around support member 702 before it is tightened. But, clamp 708 can easily fall off of support member 702 until it is tightened around drop line 706 and support member 702. Such a configuration can be troublesome since drop line 706 and clamp 708 need to be held in place while clamping them to support member 702. Additionally, clamp 708 usually cannot be pre-installed on support member 702 at the factory, because notches 704 will not retain clamp 708.

There is a need in the art, therefore, for an improved enclosure that allows individual drop lines to be added to, or removed from, the enclosure without disturbing existing transmission mediums or splices contained therein. There is also a need in the art for an improved enclosure that secures and protects the gasket between the cover plate and the enclosure's housing when the cover plate is removed. Additionally, a need exists in the art for an improved strain relief device that allows a clamp to be installed at the factory, as well as in the field.

SUMMARY OF THE INVENTION

The present invention is generally drawn to a device useful in providing communications services to homes and businesses. More specifically, the present invention is directed to an enclosure that can facilitate and protect splices and connections between a distribution cable and an individual subscriber drop line. The enclosure can facilitate connections between the distribution cable and the drop line by providing separate ports for the distribution cable and the drop line. Additionally, the enclosure can facilitate multiple connections between the distribution cable and multiple drop lines by providing separate ports for each drop line.

The enclosure can have a first port, a second port, and one or more drop ports. A first portion of the distribution cable can enter the enclosure through the first port, and a second portion of the distribution cable can enter the enclosure through the second port. One or more drop lines can enter the enclosure through a respective drop port. Inside the enclosure, an individual transmission medium can be separated from the distribution cable and spliced to form one or more drop lines. The individual drop ports can allow additional drop lines to be added or removed without disturbing items existing in the enclosure. Items existing in the enclosure can include the distribution cable, the transmission medium from the distribution cable, other drop lines, and splices or connections.

The present invention can allow multiple openings for drop lines in the enclosure without compromising the ability of the enclosure to keep out moisture and dirt. Each drop port can have a removable drop plug that can prevent moisture and dirt from entering the enclosure. If the drop port is empty, then a closed drop plug can substantially seal the empty drop port opening. If the drop port contains a drop line, then an open drop plug can substantially seal the drop port opening around the drop line. If necessary, a sealant device such as tape, caulk, insulation, or other similar items can be provided around the drop line to further seal the drop port opening.

The present invention can also allow access to the interior of the enclosure without compromising the ability of the enclosure to keep out moisture. A removable cover plate having a sealing member such as a gasket can be attached to the enclosure. The sealing member can be coupled to the cover plate. Alternatively, the sealing member can be coupled to the enclosure's housing. The sealing member can be protected from damage and dirt by remaining coupled to the cover plate or housing when the cover plate is removed. This configuration can also prevent the separate tasks of removing and protecting the sealing member when the cover plate is removed. Additionally, the sealing member can seal any gaps between the cover plate and the removable drop plugs in the drop ports.

The present invention can also provide strain relief for the drop lines or distribution cable that enter the enclosure. A strain relief device according to the present invention can comprise a support member and a clamping device. The support member can be attached to the enclosure. The clamping device can be coupled to the support member. The clamping device can then attach the drop line or the distribution cable to the support member, thereby relieving the strain on the drop line or the distribution cable. The support member can have holes or slots for receiving the clamping device. The clamping device can fit into the holes or slots. The holes or slots can mechanically hold the clamping device in place, thereby allowing the clamping device to be pre-installed at the factory or in the field.

A splitting device for dividing signals among a plurality of subscribers can also be provided in the enclosure of the present invention. If the distribution cable contains optical waveguides, then the splitting device can be an optical splitter. The optical splitter can divide optical signals among a plurality of subscribers.

These and other aspects, objects, and features of the present invention will become apparent from the following detailed description of the exemplary embodiments, read in conjunction with, and reference to, the accompanying drawings.

BRIEF DESCRIPTION OF THE DRAWINGS

FIG. 5 illustrates a perspective view of a strain relief device according to an exemplary embodiment of the present invention.

DETAILED DESCRIPTION OF EXEMPLARY EMBODIMENTS

Figure 1:
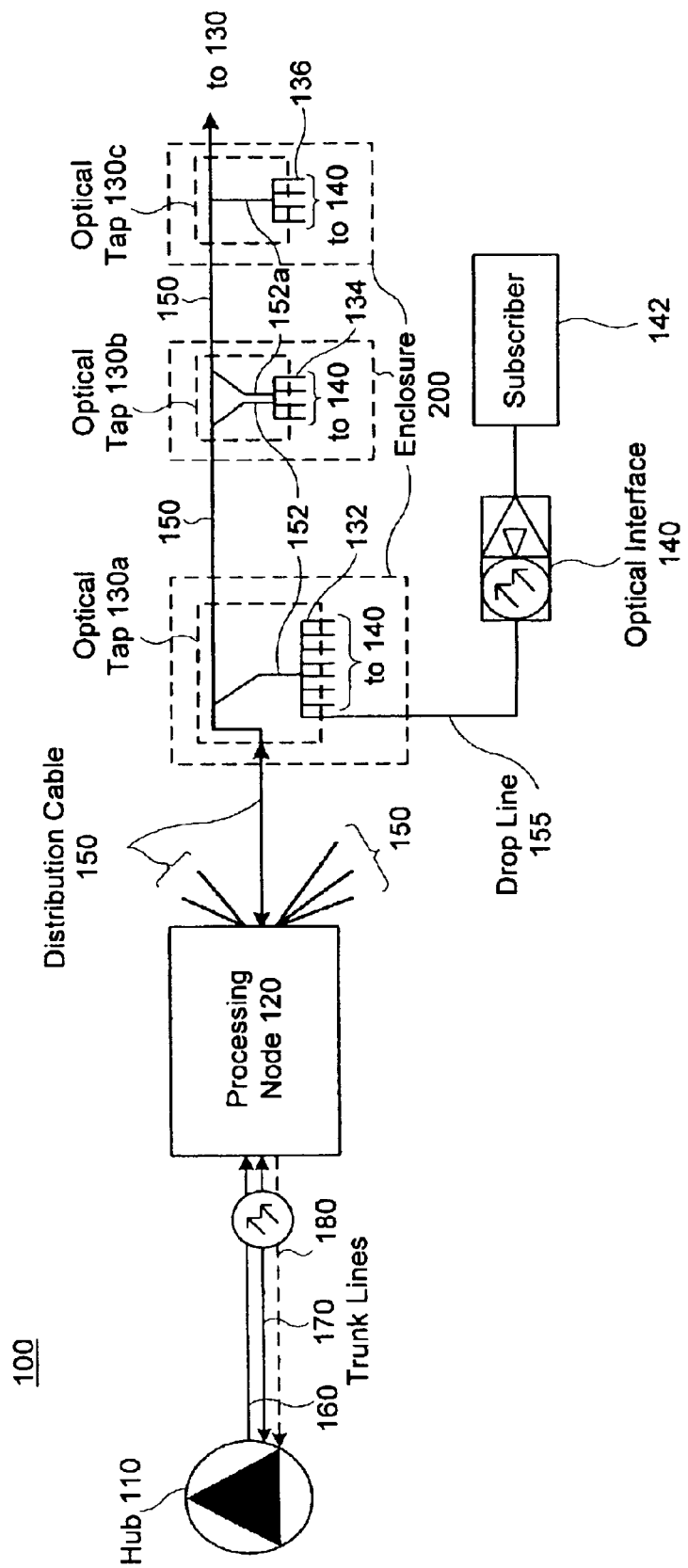
FIG. 1 is a functional block diagram illustrating some core components of an exemplary operational environment for an enclosure according to the present invention.

Exemplary embodiments of the present invention will be described in detail with reference to the accompanying drawings, in which like reference numerals represent like elements.

The present invention is directed to an enclosure that can facilitate and protect splices and connections between a distribution cable and an individual subscriber drop line. An enclosure according to the present invention can provide separate ports for the distribution cable and the drop line. The separate ports can allow additional drop lines to be added or removed without disturbing the distribution cable, existing drop lines, or other existing items in the enclosure. The enclosure according to the present invention can also contain a splitting device such as an optical splitter for dividing signals among a plurality of subscribers. The present invention can also provide a gasket coupled to the enclosure or to a cover plate on the enclosure. Accordingly, the gasket remains protected even when the cover plate is removed. A strain relief device according to the present invention can allow a clamp to be pre-installed on the device during manufacturing or in the field. The strain relief device according to the present invention can mechanically hold the clamp in place until it is tightened.

FIG. 1 is a functional block diagram illustrating some core components of an exemplary operational environment 100 for an enclosure according to the present invention. Exemplary operational environment 100 can comprise a data service headend or hub 110 connected to a processing node 120 of an optical network. Processing node 120, in turn, can be connected to optical taps 130a, 130b, 130c (collectively "optical taps 130"). Optical taps 130 can be connected to a plurality of subscriber optical interfaces 140, which can each be connected to an individual subscriber 142. Subscribers 142 can comprise individual home subscribers or business subscribers. Optical taps 130 can be provided in an enclosure 200 according to the present invention. Enclosure 200 will be discussed in detail below with reference to FIGS. 2, 3, 4A, and 4B.

Respective components of exemplary operational environment 100 are connected by trunk lines 160, 170, and 180, a distribution cable 150, and drop lines 155. Trunk lines 160, 170, and 180, distribution cable 150, and drop lines 155 can each comprise a transmission medium. Distribution cable 150 can comprise a plurality of individual transmission mediums 152. Alternatively, distribution cable 150 can comprise a single transmission medium 152. Distribution cable 150, individual transmission medium(s) 152, drop lines 155, and trunk lines 160, 170, and 180 can each comprise an optical waveguide(s).

While only an individual processing node 120, three optical taps 130 (130a, 130b, and 130c), and an individual subscriber optical interface 140 are fully illustrated in FIG. 1, a plurality of processing nodes 120, optical taps 130, and subscriber optical interfaces 140 can be employed. Typically, multiple processing nodes 120 can be connected to hub 110, multiple optical taps 130 can be connected to each distribution cable 150, and multiple subscriber optical interfaces 140 can be connected to each optical tap 130.

Distribution cable 150 and trunk lines 160, 170, and 180 are represented by arrows, where the arrowheads illustrate exemplary directions of data flow between respective components. As shown in FIG. 1, trunk lines 160, 170, and 180 can propagate optical signals from hub 110 to processing node 120. First trunk line 160 can carry broadcast video and other signals. The signals can be transmitted in a traditional cable television format wherein the broadcast signals are modulated onto carriers, which in turn modulate an optical transmitter (not shown) in hub 110. Second trunk line 170 can carry downstream targeted services such as data and telephone services to be delivered to one or more subscriber optical interfaces 140. In addition to carrying subscriber-specific optical signals, second trunk line 170 can also propagate internet protocol broadcast packets, as is understood by those skilled in the art.

Third trunk line 180 can also be provided to transport data signals upstream from processing node 120 to hub 110. The optical signals propagated along third trunk line 180 can also comprise data and telephone services received from one or more subscribers. Similarly to second trunk line 170, third trunk line 180 can also carry IP broadcast packets, as is understood by those skilled in the art.

Third trunk line 180 is illustrated with dashed lines to indicate that it is optional. As illustrated by the double arrows, second trunk line 170 can propagate optical signals in both the upstream and downstream directions. In such an exemplary configuration where second trunk line 170 propagates bi-directional optical signals, only two trunk lines 160, 170 would be needed to support the optical signals propagating between hub 110 and processing node 120. In another exemplary configuration (not shown), a single trunk line can be the only link between hub 110 and processing node 120. In such a single trunk line configuration, three different wavelengths can be used for the upstream and downstream signals. Alternatively, bi-directional data can be modulated on one wavelength.

Optical taps 130a, 130b, 130c can comprise splitting devices 132, 134, 136, respectfully. Splitting devices 132, 134, 136 can be optical splitters. Optical taps 130 allow multiple subscriber optical interfaces 140 to be coupled to an individual transmission medium 152 of distribution cable 150. In the exemplary operational environment 100 shown in FIG. 1, each individual transmission medium 152 can provide service to eight subscribers 142. Those skilled in the art will appreciate that the number of subscriber optical interfaces 140 assigned to a particular individual transmission medium 152 can be varied or changed without departing from the scope and spirit of the present invention.

As shown in FIG. 1, optical tap 130a can comprise splitting device 132, which can be an 8-way optical splitter. The 8-way optical splitter can divide downstream optical signals eight ways to serve eight different subscriber optical interfaces 140. In the upstream direction, splitting device 132 of optical tap 130a can combine optical signals received from the eight subscriber optical interfaces 140. At optical tap 130a, a first individual transmission medium 152 is routed from distribution cable 150 to splitting device 132. First individual transmission medium 152 is then terminated at splitting device 132 to serve eight subscribers.

Optical tap 130b can comprise splitting device 134, which can be a 4-way optical splitter serving four subscriber optical interfaces 140. As shown in FIG. 1, splitting device 134 can be a 4-way optical splitter that is also a pass-through tap. The pass-through tap can extract a portion of the optical signal received at optical tap 130b to serve the 4-way optical splitter contained therein, while the remaining optical energy can be further propagated downstream to another optical tap 130c or another subscriber optical interface 140 (not shown). In this exemplary configuration, a first portion of individual transmission medium 152 can be routed to the 4-way, pass-through splitter (splitting device 134) in optical tap 130b. Then, a second portion 152a of individual transmission medium 152 can be routed from splitting device 134 back into distribution cable 150 and to the 4-way splitter (splitting device 136) contained in optical tap 130c.

The present invention is not limited to optical taps having 4-way and 8-way optical splitters. Other optical taps having more or less than 4-way or 8-way splits are within the scope of the present invention.

Other exemplary operational environments for an enclosure according to the present invention are described in U.S. application Ser. No. 09/899,410, entitled "System and Method for Communicating Optical Signals Between a Data Service Provider and Subscribers," filed Jul. 5, 2001. The present invention is not limited to the exemplary operational environments disclosed in that application or discussed above with reference to FIG. 1. The present invention can be applied to any system in which two transmission mediums are coupled together. For example, distribution cable 150 can comprise coaxial cable(s), telephone wires, or electrical wires. Additionally, distribution cable 150 can comprise any combination of coaxial cable, telephone wires, electrical wires, and/or optical waveguides. Drop lines 155 can then be composed of a suitable transmission medium depending on the application. Drop lines 155 can also comprise any combination of the transmission mediums mentioned above.

Additionally, each component of the system can then be a suitable component to operate with the particular application.

An enclosure 200 according to the present invention will now be described with reference to FIGS. 2, 3, 4A, and 4B. Enclosure 200 will be described for use with an optical network as described above with reference to FIG. 1. However, enclosure 200 can be used for any of the transmission media discussed above.

Figure 2A:
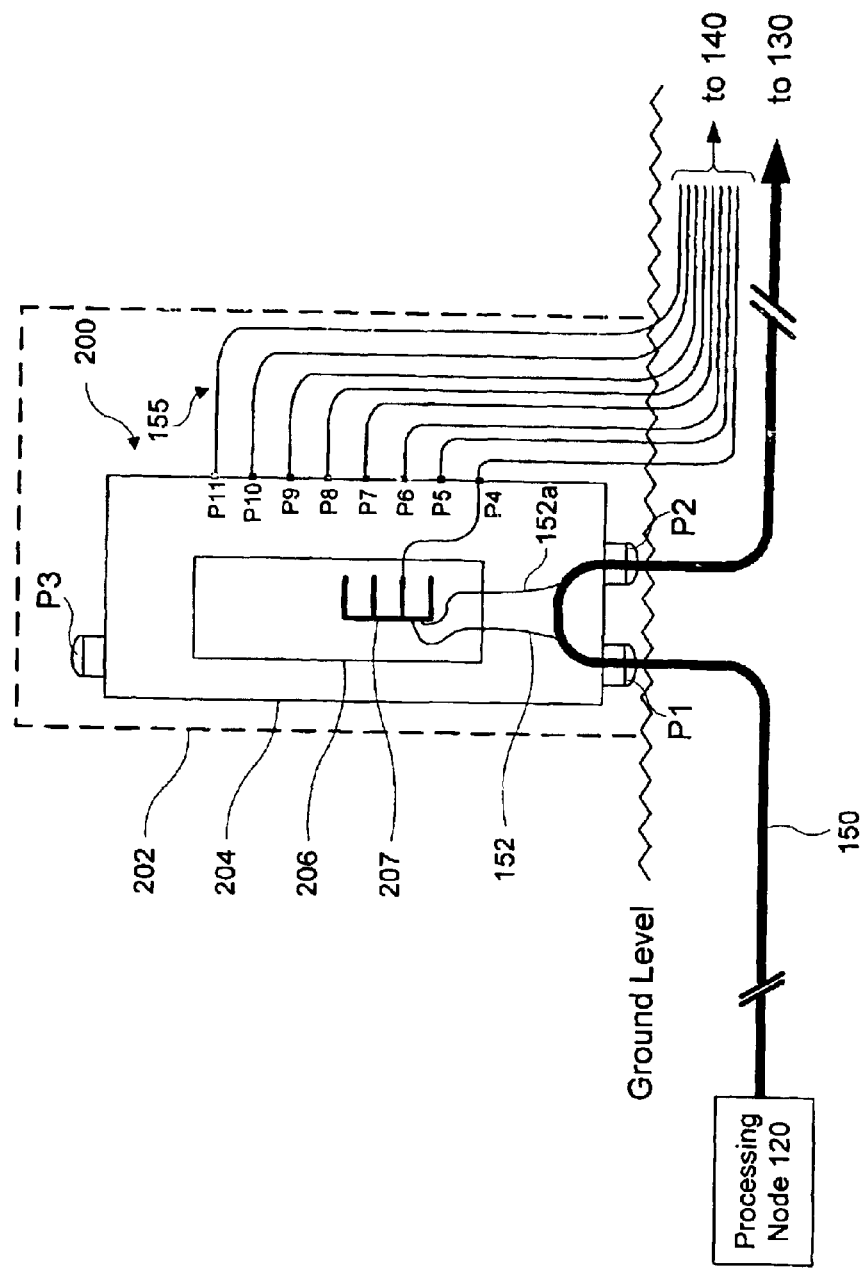
FIG. 2A illustrates a pedestal-mount configuration of an enclosure according to one exemplary embodiment of the present invention.

Referring now to FIG. 2A, a pedestal-mount configuration of enclosure 200 according to an exemplary embodiment of the present invention will be described. Enclosure 200 can protect optical tap 130, which is represented in FIG. 2 by a splitting device 207. Enclosure 200 comprises a housing 204. Housing 204 can comprise first, second, and third ports P1, P2, P3 and drop ports P4–P11. Enclosure 204 can also comprise a splice tray 206. A pedestal 202 can be positioned over enclosure 200 to improve the aesthetic appeal of the installation and to protect enclosure 200 and the transmission mediums contained therein from damage.

From processing node 120, distribution cable 150 can be buried below ground level. At enclosure 200, a first portion of distribution cable 150 can be accessed through the ground to enter enclosure 200 through first port P1. A second portion of distribution cable 150 can enter enclosure 200 through second port P2. From enclosure 200, distribution cable 150 can be routed below ground level to another optical tap 130. In the pedestal mount configuration shown in FIG. 2A, third port P3 is not typically used. The unused third port P3 can be sealed to prevent moisture from entering enclosure 200. While distribution cable 150 is inside enclosure 200, an individual transmission medium 152 can be extracted from distribution cable 150 using a ring cut or other technique. Such techniques are well-known to those skilled in the art. Individual transmission medium 152 can be directed to splice tray 206 where it can be coupled to drop lines 155. Transmission medium 152 can be coupled to drop lines 155 by a splice, a connector, or other suitable method or device.

Splice tray 206 can be part of enclosure 100 or optical tap 130. In the latter case, splice tray 206 can be coupled to splitting device 207. Splice tray 206 stores and protects optical fiber splices and connectors that are used in optical tap 130. If an individual transmission medium 152 is terminated in splice tray 206, then the remaining portion 152a of individual transmission medium 152 can be terminated in enclosure 200. If individual transmission medium 152 is designed to support communications to/from another optical tap 130, then remaining portion 152a of transmission medium 152 can be connected in splice tray 206 to provide a communications path with the other optical tap 130.

Drop lines 155 enter enclosure 200 through drop ports P4–P11. For illustrative purposes, the drop line 155 at drop port P4 is shown as originating from splice tray 206 and splitting device 207. Each drop line 155 receives a portion of the signal on transmission medium 152 by way of splitting device 207. Each drop line 155 can also be connected to an optical interface 140 to provide service to an individual subscriber 142 (FIG. 1). As shown in FIG. 2A, eight drop ports P4–P11 and eight drop lines 155 can be provided. However, the present invention is not limited to such a configuration. For example, additional or fewer drop ports than are illustrated in FIG. 2A can be provided. Further, more or less drop lines than are illustrated in FIG. 2A can be provided. Each drop port does not require a drop line 155. In other words, some drop ports can remain empty. Additionally, splitting device 207 is shown in FIG. 2A as a 4-way splitting device. As discussed above, the present invention is not limited to 4-way power division.

Enclosure 200 provides protection for the optical components contained therein. Enclosure 200 can contain optical splitter 207, typically in splice tray 206, as well as space for managing distribution cable 150, individual transmission medium 152, drop lines 155, and any other splices or connectors contained therein. As discussed above, enclosure 200 can be used for any type or combination of transmission mediums. For example, enclosure 200 can be used for optical waveguides. Additionally, enclosure 200 can be used for coaxial cable, telephone cable or wires, and/or electrical wires in place of, or in addition to, optical waveguides.

Figure 2B:
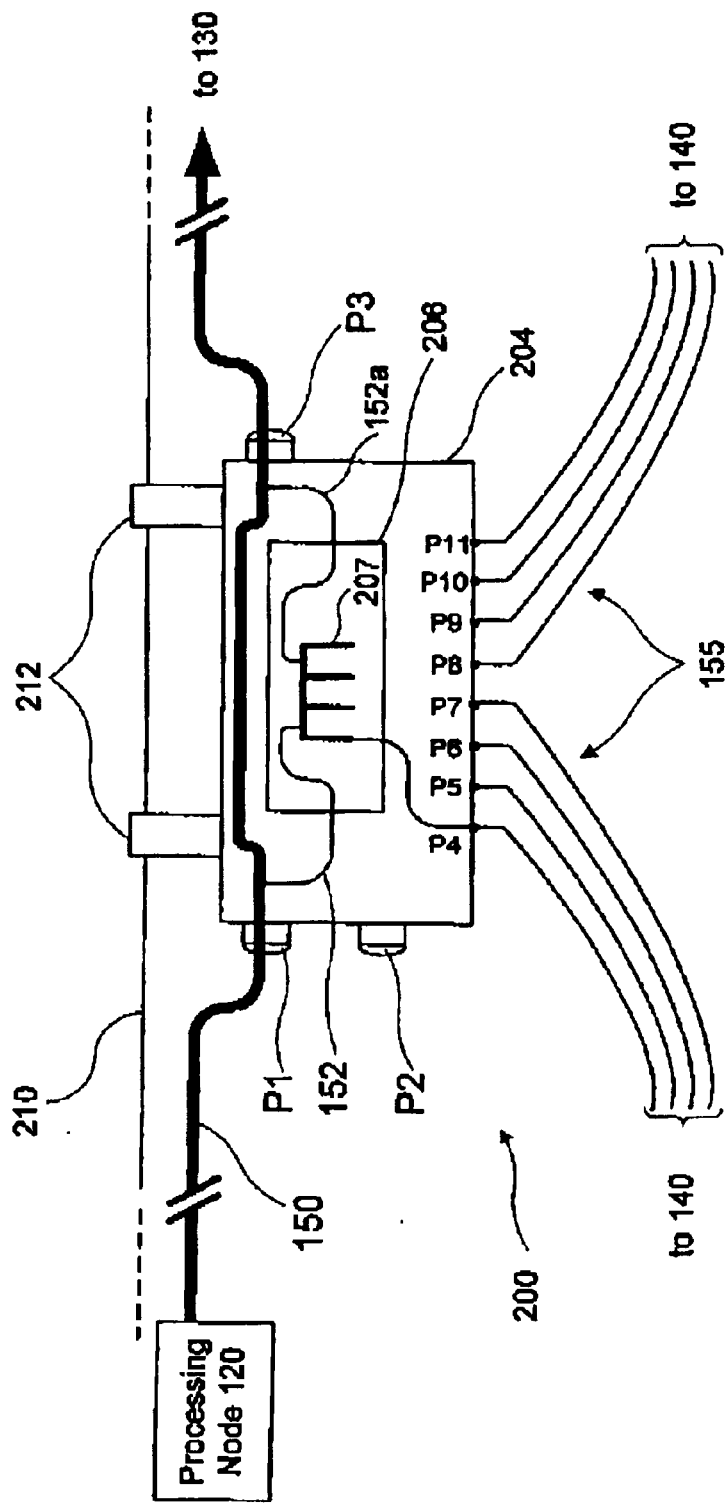
FIG. 2B illustrates a strand-mount configuration of an enclosure according to another exemplary embodiment of the present invention.

Referring to FIG. 2B, a strand-mount configuration of enclosure 200 according to another exemplary embodiment of the present invention will be described. As shown in FIG. 2B, one or more strand clamps 212 can be coupled to enclosure 200 so that enclosure 200 can be attached to a support cable or wire 210 by strand clamps 212. Typically, support cable 210 can comprise a steel cable connected between two utility poles. Support cable 210 can provide support for transmission mediums attached thereto. Fiber optic, telephone, electrical, and coaxial cables can be attached to support cable 210. In the strand-mount configuration, a first portion of distribution cable 150 can enter enclosure 200 through first port P1. A second portion of distribution cable 150 can enter enclosure 200 through third port P3. Second port P2 is typically not used in the strand-mount configuration. The unused port P2 can be sealed to prevent moisture from entering enclosure 200. All other aspects of enclosure 200 shown in FIG. 2B are the same as those shown in FIG. 2A.

Figure 3:
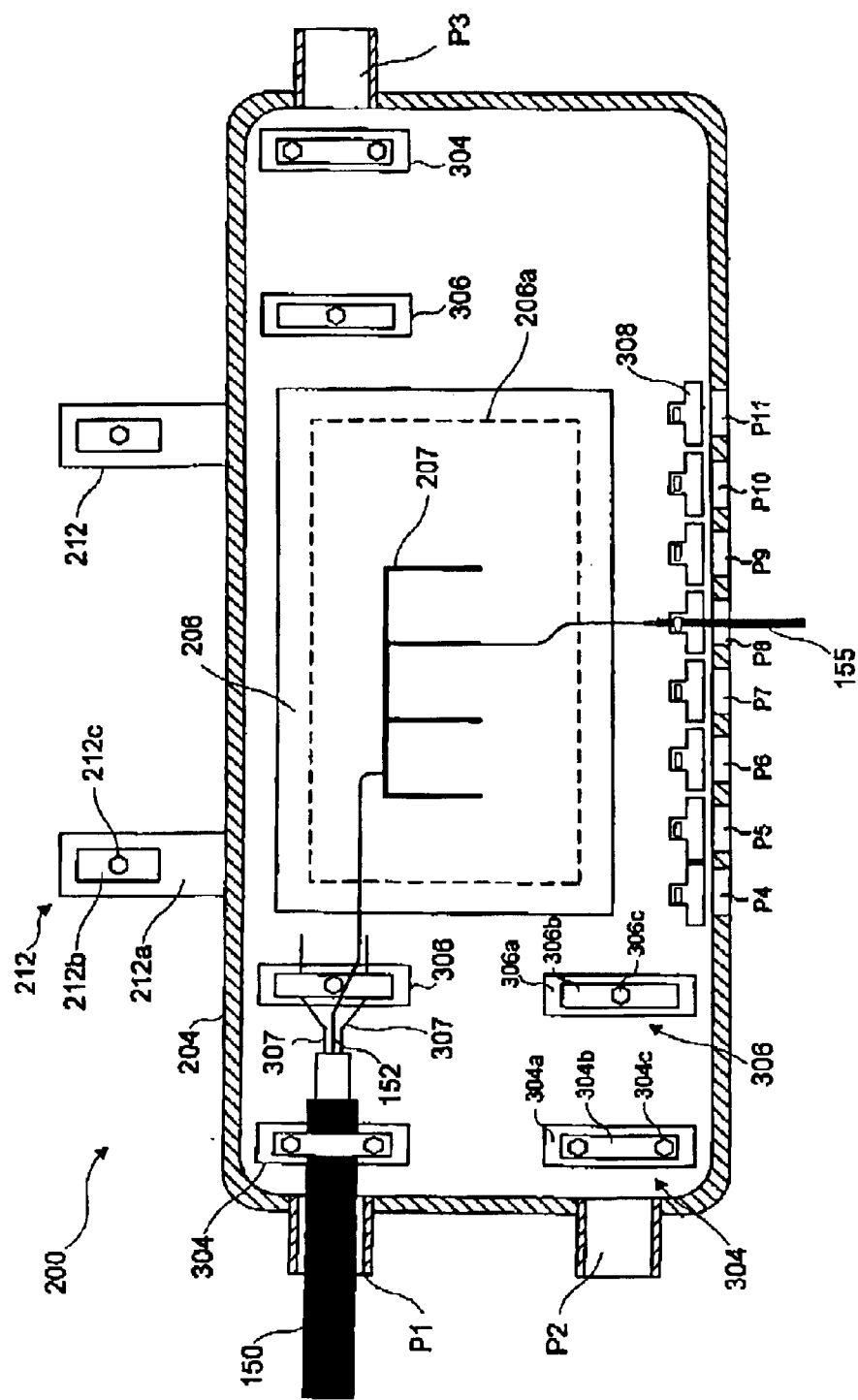
FIG. 3 illustrates a cross section of an enclosure according to an exemplary embodiment of the present invention.
Figure 4A:
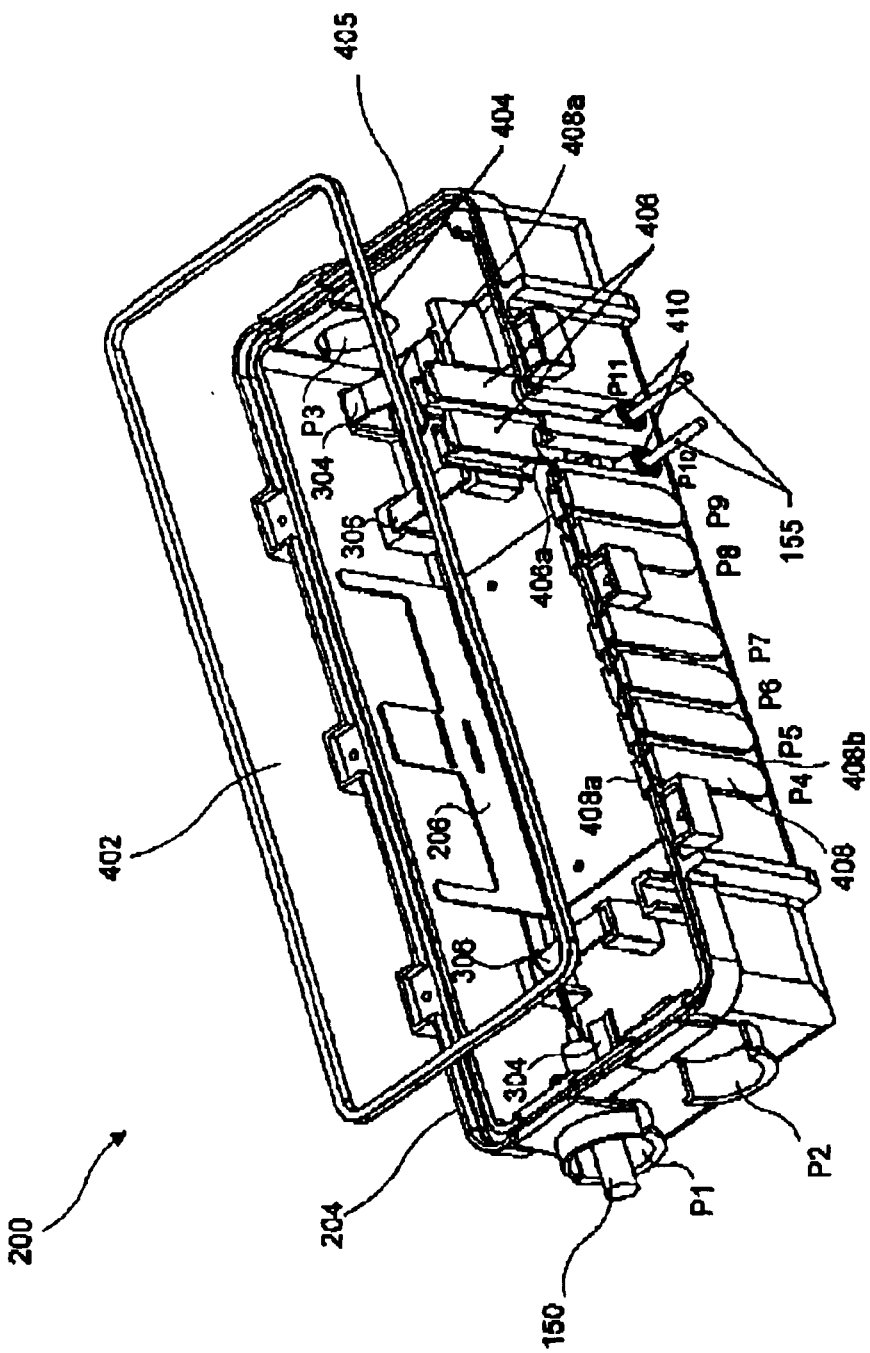
FIG. 4A illustrates a perspective view of an enclosure according to an exemplary embodiment of the present invention.
Figure 4B:
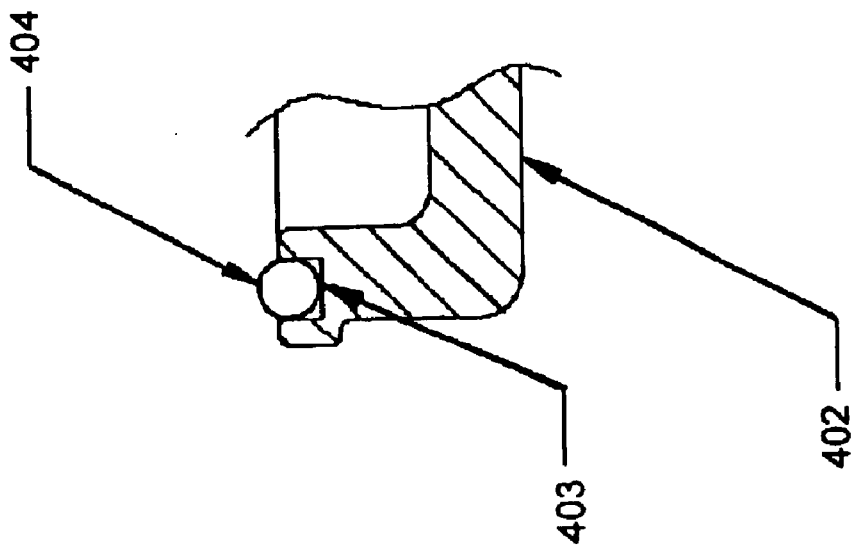
FIG. 4B illustrates a cross section of a cover plate having a sealing member retaining device according to an exemplary embodiment of the present invention.

Referring now to FIGS. 3, 4A, and 4B, enclosure 200 will be described in more detail. FIG. 3 illustrates a cross section of enclosure 200 according to an exemplary embodiment the present invention. As discussed earlier, enclosure 200 comprises housing 204. Housing 204 can be made from a variety of materials such as metal or molded plastic. Housing 204 can comprise first, second, and third ports P1, P2, and P3, which allow for entry of distribution cable 150. Typically, first and second ports P1 and P2 are used in a pedestal-mount configuration, while first and third ports P1 and P3 are used in a strand-mount configuration. However, any combination or order of ports P1–P3 can be used without departing from the scope of the present invention. Additionally, fewer or additional ports can be provided in enclosure 200 without departing from the scope of the present invention.

As shown in FIG. 3, strand clamps 212 can comprise a support member 212a, a clamping member 212b, and a locking member 212c. Locking member 212c can comprise a screw or a bolt.

Distribution cable 150 is shown entering enclosure 200 through port P1. Once distribution cable 150 is inside enclosure 200, individual transmission medium 152 of distribution cable 150 can be manipulated as needed. Typically, individual transmission medium 152 is routed to splice tray 206 In splice tray 206, individual transmission medium 152 can be connected to one or more drop lines 155 trough splitting device 207.

A strain relief device such as a hose clamp 304 can be provided adjacent to ports P1–P3 to provide strain relief for distribution cable 150. Hose clamp 304 can be coupled to housing 204 with bolts or screws, or by gluing, welding, or other methods. Hose clamp 304 can comprise a support member 304a, a clamping member 304b, and locking members 304c. Locking members 304c can comprise screws or bolts. In operation, hose clamp 304 can be coupled to enclosure 204. Clamping member 304b can be secured around distribution cable 150 by tightening locking members 304c, thereby holding distribution cable 150 to support member 304a. The present invention is not limited to the hose clamp 304 described above. Any suitable clamping device for holding distribution cable 150 in housing 204 can be used without departing from the scope and spirit of the present invention.

Near each hose clamp 304, a strain relief device such as a strength member clamp 306 can be provided. Strength member clamp 306 can be coupled to housing 204 with bolts or screws, or by gluing, welding, or other methods. Strength member clamp 306 can comprise a support member 306a, a clamping member 306b, and a locking member 306c. Locking member 306c can comprise a screw or a bolt. In operation, strength member clamp 306 can be coupled to enclosure 204 near hose clamp 304, As shown in FIG. 3, strength members 307 can be provided in distribution cable 150. Strength members 307 can comprise a strand formed of metal, fiberglass, kevlar, or other nonstretchable material. Clamping member 306b can be secured around strength members 307 by tightening locking member 306c, thereby holding strength members 307 to support member 306a.

For a single stage strain relief of distribution cable 150, either hose clamp 304 or strength member clamp 306 can be provided alone for each of ports P1–P3 in housing 204. Alternatively, hose clamp 304 and strength member clamp 306 can both be provided for each of ports P1–P3 in housing 204 to create a two-stage strain relief system for distribution cable 150.

Housing 204 can also comprise drop ports P4–P11. Drop ports P4–P11 can allow drop lines 155 to enter enclosure 200. Inside enclosure 200, drop lines 155 can be routed to a cable or fiber management apparatus such as splice tray 206. Drop ports P4–P11 can be smaller in size than ports P1–P3. In other words, the cross-sectional area of an opening in housing 204 provided by a drop port P4–P11 can be smaller than the cross-sectional area of an opening in housing 204 provided by a port P1–P3. Drop ports P4–P11 can be sized smaller than ports P1–P3 because drop lines 155 are typically comprised of only one or two transmission mediums, while distribution cable 150 is typically comprised of one larger transmission medium or a plurality of transmission mediums.

A strain relief device 308 can be provided at each drop port P4–P11. Strain relief device 308 can be coupled to housing 204 with bolts or screws, or by gluing, welding, or other methods. Strain relief device 308 can be coupled to housing 204. The strain relief device 308 can clamp individual drop lines 155 securely to enclosure 200, thereby relieving strain on drop lines 155. Strain relief device 308 can be provided alone for each of ports P4–P11 in housing 204 to create a single stage strain relief of drop lines 155. Strain relief device 308 can be sized to correspond to the size of the drop line 155 that enters a respective one of drop ports P4–P11. Accordingly, strain relief device 308, which accommodates the drop line 155, can be smaller than hose clamp 304, which accommodates distribution cable 150. In other words, hose clamp 304 can define a first hole through which a distribution cable 150 can be inserted, and strain relief device 308 can define a second hole through which a drop line 155 can be inserted. Consequently, a cross-sectional area of the second hole can be smaller than a cross-sectional area of the first hole. Strain relief device 308 will be discussed in more detail below with reference to FIGS. 5 and 6A–6D.

Drop ports P4–P11 allow easy access for adding or removing drop lines 155 from enclosure 200. Additionally, drop ports P4–P11 make it possible to add and remove drop lines 155 without disturbing other drop lines 155, distribution cable 150, or individual transmission medium 152. This feature is especially useful when drop lines 155 comprise one or more optical fiber strands. The present invention facilitates easy addition or removal of drop lines 155 whether enclosure 200 is mounted in a pedestal-mount or strand-mount configuration. Each of drop ports P4–P11 can be sized to allow a drop line 155 having one or more optical fiber strands to be inserted. Such optical fiber strand(s) of drop line 155 can provide service to subscribers 142 (FIG. 1). Additionally, drop line 155 can comprise one or more layers of protective insulation to strengthen drop line 155 and to protect the optical fiber strand(s) contained therein.

Typically, drop lines 155 comprise a single fiber strand surrounded by a protective sleeve. In some cases, drop lines 155 may also comprise a coaxial cable (not shown) for delivery of RF modulated signals, and/or it may comprise other individual transmission mediums (not shown) such as telephone or electrical wires. The other transmission mediums can be used for a variety of purposes. For example, the other transmission mediums can provide power from a network to feed electronic circuitry at the subscriber's location, or it can carry telephone calls or data. Additionally, drop lines 155 can comprise a messenger, which is a strength member (not shown).

Splice tray 206 is a management area for enclosing splices and connections. The splices and connections can be between drop line 155 and individual transmission medium 152 of distribution cable 150. Splice tray 206 can also enclose an electrical interface (not shown) for any of the transmission mediums discussed above. Additionally, at least one splitting device 207 can be provided in splice tray 206. Splitting device 207 can comprise an optical splitter and can provide either 4-way or 8-way optical power division. Alternatively, splitting device 207 can provide 4-way power division preceded by 2-way power division in the case of a 4-way pass-through tap. The present invention is not limited to the power divisions described above. Other types of splitting can be used. For example, more or less than 4-way or 8-way splits can be used.

A second cable or fiber management apparatus such as a second splice tray 206a can also be provided in enclosure 200. When second splice tray 206a is provided, a two-stage operation of coupling drop lines 155 to transmission medium 152 can be performed. In splice tray 206, transmission medium 152 can be coupled to splitting device 207. If splitting device 207 provides 8-way power division, then each of eight connector transmission mediums (not shown) can be coupled on one end to splitting device 207. The other end of each connector transmission medium can be routed to second splice tray 206a. In second splice tray 206a, drop lines 155 can be coupled as needed to a respective connector transmission medium. If splitting device 207 provides more or less than 8-way power division, then the number of connector transmission mediums can be adjusted accordingly.

Referring to FIG. 4A, further features of enclosure 200 will be described. FIG. 4A illustrates a perspective view of enclosure 200 according to an exemplary embodiment of the present invention. As shown in FIG. 4A, drop ports P4–P11 can comprise slots or channels in housing 204 of enclosure 200. Drop plugs 406 and 408 can be provided to substantially seal drop ports P4–P11 to prevent moisture from entering enclosure 200. Drop plugs 406, 408 can be composed of cast metal, molded plastic, or other materials similar to the materials of housing 204. Additionally, a sealing means (not shown) formed of rubber or a similar material can be provided with drop plugs 406, 408 to further seal drop ports P4–P11.

As illustrated, drop lines 155 can be provided in drop ports P10 and P11. For those drop ports where a drop line 155 is provided, an open drop plug 406 can be used to substantially seal drop ports P10 and P11 around drop lines 155. Open drop plugs 406 have a concave-rounded end 406a that substantially seals around drop lines 155. If necessary, additional sealing devices 410 may be provided around drop lines 155 to further seal any remaining opening(s) in drop ports P10 and P11. Sealing devices 410 can comprise sealant tape, caulk, insulation, washers, or other similar materials. In an alternative embodiment (not shown), open drop plug 406 can comprise a grommet-type of plug, where a drop line 155 can be inserted into a hole in the grommet-type plug.

In the exemplary embodiment illustrated in FIG. 4A, ports P4–P9 do not contain a drop line 155. For each empty drop port P4–P9, a closed drop plug 408 can be provided. Closed drop plugs 408 can be shaped to substantially fill the slot of empty drop ports P4–P9. As shown, closed drop plugs 408 can comprise a convex-rounded end 408b for that purpose.

The present invention is not limited to the number or shape of drop ports and drop plugs shown in FIG. 4A. For example, additional or fewer drop ports than those illustrated in FIG. 4A can be provided. If enclosure 200 is provided in a dry location, drop plugs 406 and 408 can be omitted. Additionally, drop ports P4–P11 can have a different shape that that shown in FIG. 4A, or drop ports P4–P11 can be holes in enclosure 204. In those alternative configurations, drop plugs 406 and 408 can be shaped as required to correspond to the shape of drop ports P4–P11.

FIG. 4A also illustrates a cover plate 402 for enclosing an interior of housing 204. As shown, cover plate 402 can be removably coupled to housing 204. Alternatively, cover plate 402 can be pivotally coupled to housing 204 by a hinge (not shown) that is coupled to both cover plate 402 and housing 204. Cover plate 402 can be coupled to housing 204 at an exterior edge 405 of housing 204. Additionally, cover plate 402 can rest on an exterior edge 408a of each drop plug 406 and 408. A sealing member 404 can be provided to substantially seal any gaps between cover plate 402 and housing 204 and between cover plate 402 and exterior edges 408a of drop plugs 406, 408 to prevent moisture from entering enclosure 200. Sealing member 404 can comprise a gasket.

As shown, sealing member 404 can be coupled to the perimeter of cover plate 402. In such an exemplary configuration, when cover plate 402 is removed from housing 204, sealing member 404 can be removed with cover plate 402 so that sealing member 404 does not have to be separately removed and replaced. Accordingly, such a configuration provides convenience for simplified removal of both cover plate 402 and sealing member 404. Additionally, sealing member 404 remains protected by cover plate 402 while they are removed from housing 204.

Sealing member 404 can be coupled to cover plate 402 in a variety of ways. For example, sealing member 404 can be coupled to cover plate 402 with an adhesive. The adhesive can be an RTV adhesive. Additionally, a sealing member retaining device 403 (FIG. 4B) can be molded on, or coupled to, the perimeter of cover plate 402. FIG. 4B illustrates a cross section of retaining device 403 on cover plate 402 according to an exemplary embodiment of the present invention. Retaining device 403 can comprise a channel molded in the perimeter of cover plate 402. Retaining device 403 can then hold sealing member 404 to cover plate 402 by tension or compression. Alternatively, individual holders such as clips (not shown) can be provided on the perimeter of cover plate 402 to hold sealing member 404 in place. Furthermore, sealing member 404 can be coupled to exterior edge 405 of housing 204. Any of the methods discussed above for coupling sealing member 404 to cover plate 402 can be used to couple sealing member 404 to housing 204.

Referring to FIGS. 5 and 6A–6D, strain relief device 308 for drop lines 155 will be described in detail. FIG. 5 illustrates a perspective view of strain relief device 308 according to an exemplary embodiment of the present invention. Strain relief device 308 can comprise a support member 308a having a clamp receiving portion 308b. A clamping device 308c can be coupled to support member 308a at clamp receiving portion 308b. During operation, a drop line 155 can be inserted into clamping device 308c. Clamping device 308c can then closed around drop line 155 to secure drop line 155 to support member 308a.

Clamping device 308c can be any suitable device for clamping drop line 155. For example, clamping device 308c can comprise a band that is fastened back on itself to secure drop line 155 to support member 308a. Such a band can comprise a first portion and a second portion, wherein the first portion of the band fastens to the second portion of the band. In an exemplary embodiment, a plastic band having the structure described above can be used. Such a plastic band is known by the trade name TYWRAP. Alternatively, clamping device 308c can comprise a hose clamp.

Figure 6B:
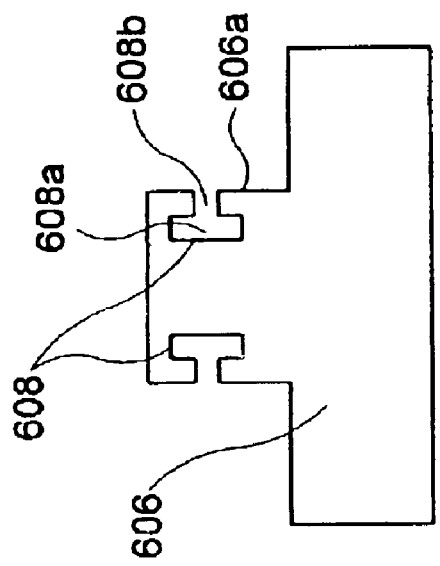
FIGS. 6A, 6B, 6C, and 6D illustrate alternative support members of a strain relief device according to exemplary embodiments of the present invention.
Figure 6A:
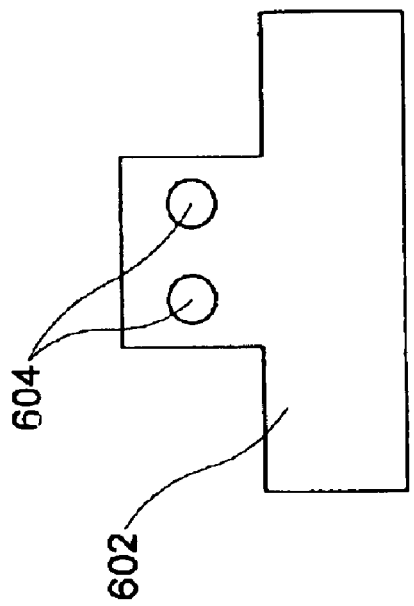
Figure 6C:
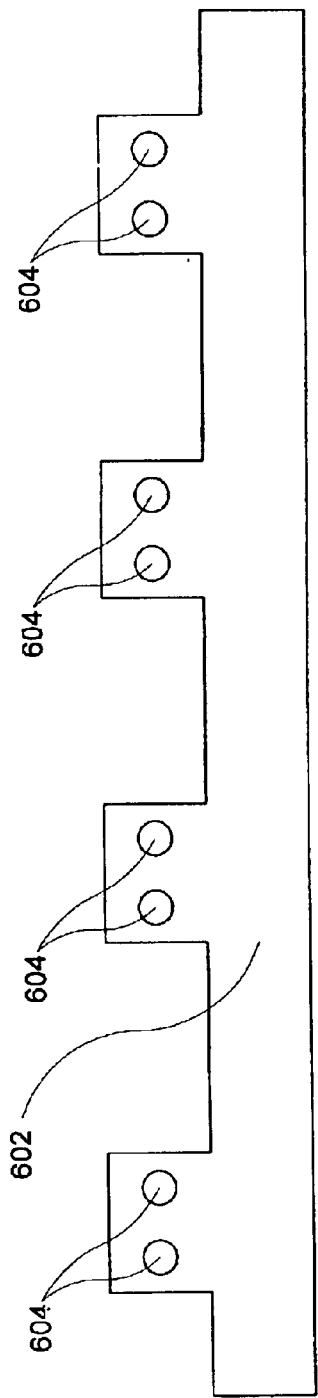

Referring to FIGS. 6A–6D, a support member for a strain relief device according to alternative exemplary embodiments of the present invention will be described. In FIG. 6A, a support member 602 can comprise one or more clamp receiving portions 604. Clamp receiving portions 604 can be holes in support member 602. A clamping device can be threaded through the holes of clamp receiving portion 604. As shown in FIG. 6C, support member 602 can comprise a plurality of clamp receiving portions 604 for receiving a plurality of clamping devices. Accordingly, a strain relief device 308 comprising the support member 602 of FIG. 6C can provide strain relief to a plurality of drop lines 155 entering enclosure 204 through a plurality of respective drop ports.

Figure 6D:
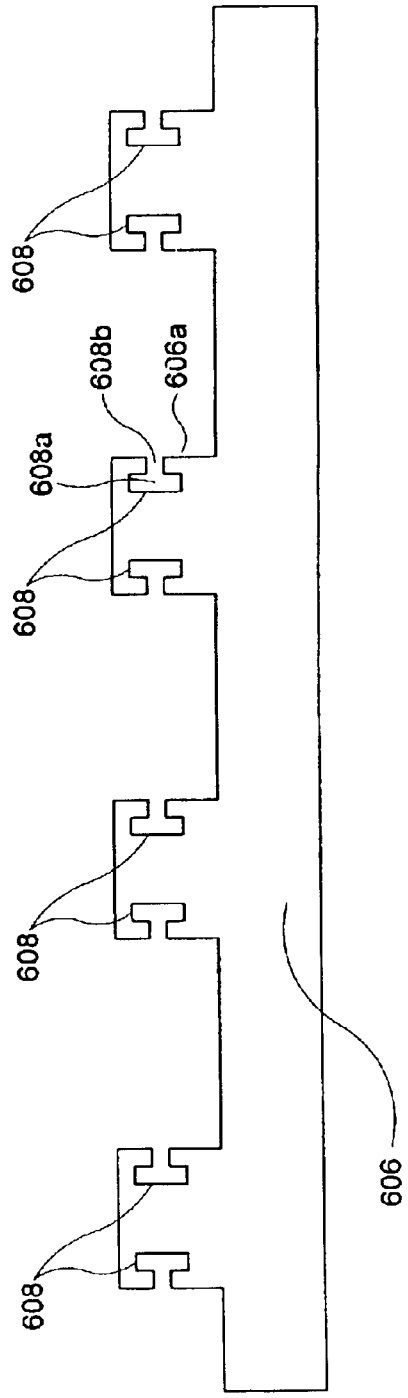
Figure 7B:
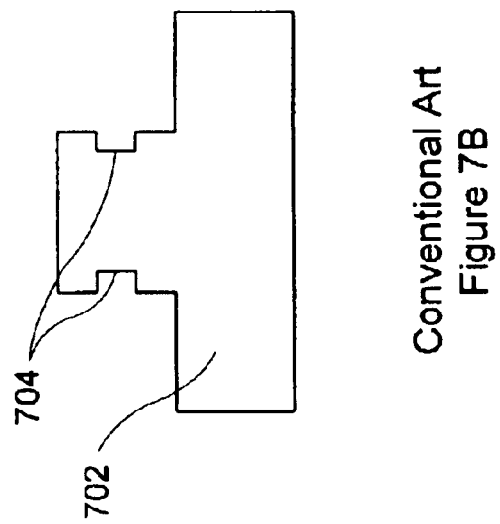
FIGS. 7A and 7B illustrate a conventional strain relief device.
Figure 7A:
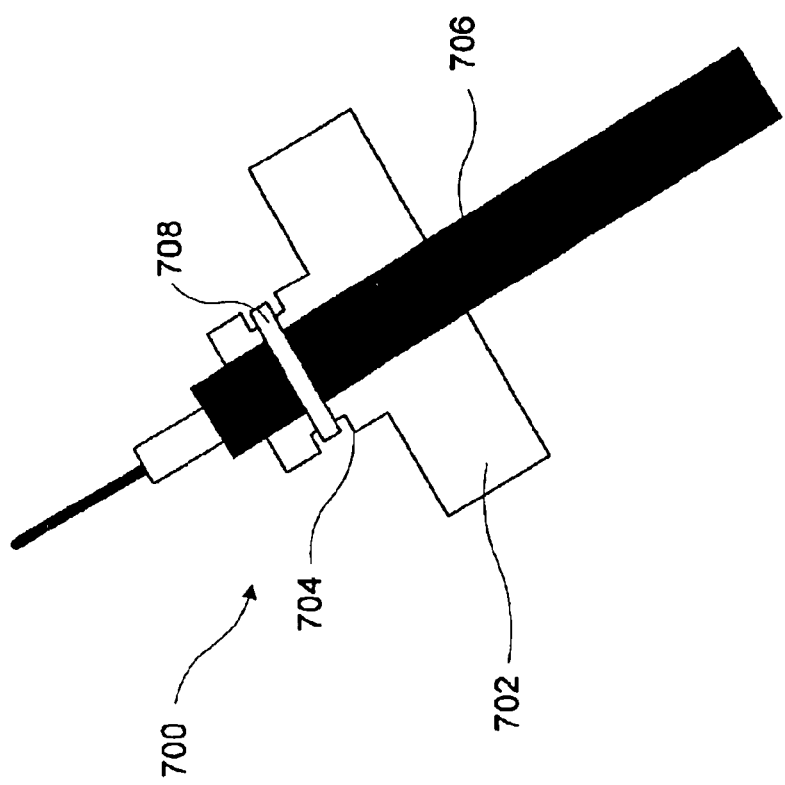

Alternatively, in FIG. 6B, a support member 606 can comprise one or more clamp receiving portions 608. Clamp receiving portions 608 can comprise slots in support member 606. Each slot can be T-shaped and can comprise a first opening 608a disposed substantially perpendicular to an edge 606a of support member 606 and a second opening 608b leading from the first opening 608a to edge 606a. Clamp receiving portions 608 allow for easy installation of a clamping device. A clamping device can be threaded into first openings 608a of clamp receiving portions 608. Alternatively, the clamping device can be inserted into first openings 608a of clamp receiving portions 608 through second openings 608b. As shown in FIG. 6D, support member 606 can comprise a plurality of clamp receiving portions 608 for receiving a plurality of clamping devices. Accordingly, a strain relief device 308 comprising the support member 606 of FIG. 6D can provide strain relief to a plurality of drop lines 155 entering enclosure 204 through a plurality of respective drop ports.

The present invention is not limited to clamp receiving portions 604 and 608 shown in FIGS. 6A–6D. For example, only one clamp receiving portion 604 or 608 can be provided. Also, first opening 608a can be disposed at other angles that are not substantially perpendicular to edge 606a. Additionally, other shapes of clamp receiving portions 604, 608 can be provided within the scope of the present invention.

The clamp receiving portions of the present invention described above mechanically hold the clamping device in place even before it is tightened against the support member and a transmission medium. Accordingly, the clamp receiving portions described above allow a manufacturer to pre-install a clamping device during manufacturing of the strain relief device. The clamp receiving portions mechanically hold the clamping device in place until it is used. Thus, the clamping device would not require installation in the field. Additionally, the use of a clamp receiving portion 608 comprising first and second openings allows for quick and easy replacement of a clamping device in the field. The use of a clamp receiving portion 604 comprising a hole in the support member can also serve that function. The clamp receiving portions described above also mechanically hold the clamping device in place while a transmission medium is inserted and secured to the support member.

Although specific embodiments of the present invention have been described above in detail, it will be understood that this description is merely for purposes of illustration. Various modifications of the disclosed aspects of the preferred embodiments, in addition to those described above, may be made by those skilled in the art without departing from the spirit of the present invention defined in the following claims, the scope of which is to be accorded the broadest interpretation so as to encompass such modifications and equivalent structures.

What is claimed is:

1. An enclosure for a transmission medium of a distribution cable and a drop line, said enclosure comprising:
   a housing;
   a first port in said housing allowing a first portion of a distribution cable to enter said housing;
   a second port in said housing allowing a second portion of a distribution cable to enter said housing;
   a drop port in said housing allowing a drop line to enter said housing via its own port; and
   a removable, open drop plus comprising a concave-rounded end that substantially seals said drop port around a drop line,
   wherein, in said housing, a drop line that enters said housing through said drop port can be coupled to a transmission medium of the distribution cable.

2. The enclosure according to claim 1, wherein the distribution cable comprises an optical fiber distribution cable having at least one individual optical fiber strand as the transmission medium.

3. The enclosure according to claim 1, wherein the distribution cable comprises a coaxial cable having at least one coaxial transmission medium.

4. The enclosure according to claim 1, wherein the distribution cable comprises an electrical distribution cable having at least one electrical transmission medium.

5. The enclosure according to claim 1, wherein the distribution cable comprises a telephone distribution cable having at least one telephone transmission medium.

6. The enclosure according to claim 1, wherein, in said housing, the drop line that enters said housing through said drop port can be coupled to the transmission medium of the distribution cable through an optical device.

7. The enclosure according to claim 1, wherein, in said housing, the drop line that enters said housing through said drop port can be coupled to the transmission medium of the distribution cable through an optical splitter.

8. The enclosure according to claim 1, further comprising a removable, closed drop plug that substantially seals said drop port when said drop port is empty.

9. The enclosure according to claim 1, further comprising a strain relief device capable of coupling a drop line to said housing, said strain relief device comprising:
   a support member coupled to said housing and disposed adjacent to said drop port, said support member having a clamp receiving portion comprising an opening leading from an edge of said support member to an interior of said support member; and
   a clamping device coupled to said support member at said clamp receiving portion,
   wherein said clamp receiving portion of said support member mechanically holds said clamping device in place before said clamping device is tightened.

10. The enclosure according to claim 1,
    wherein said enclosure comprises a plurality of drop ports in said housing, each drop port of said plurality of drop ports allowing a drop line to enter said housing via its own drop port,
    wherein, in said housing, a drop line that enters said housing through a drop port of said plurality of drop ports can be coupled to the transmission medium of the distribution cable.

11. The enclosure according to claim 10, wherein said enclosure comprises a plurality of open drop plugs, each open drop plug comprising a concave-rounded end that substantially seals a respective drop port of said plurality of drop ports through which a drop line enters said housing; and
    wherein said enclosure further comprises a closed drop plug that substantially seals a respective empty drop port of the plurality of drop ports.

12. The enclosure according to claim 11, further comprising a sealing device disposed between one of said open drop plugs and a drop line that enters said housing.

13. An enclosure for a transmission medium of a distribution cable and a drop line, said enclosure comprising:
    a housing having an interior;
    a first port in said housing, said first port providing an opening to the interior of said housing and being sized to allow a distribution cable to enter said housing;
    a drop port in said housing, said drop port providing an opening to the interior of said housing and being sized to allow a drop line to enter said housing via its own port; and
    a removable, open drop plug comprising a concave-rounded end that substantially seals said drop port if said drop port contains a drop line.

14. The enclosure according to claim 13, wherein the distribution cable comprises an optical fiber distribution cable having at least one individual optical fiber strand as the transmission medium.

15. The enclosure according to claim 13, further comprising a removable, closed drop plug that substantially seals said drop port when said drop port is empty.

16. The enclosure according to claim 13, further comprising a strain relief device capable of coupling a drop line to said housing, said strain relief device comprising:
    a support member coupled to said housing, said support member having a clamp receiving portion comprising an opening leading from an edge of said support member to an interior of said support member; and a clamping device coupled to said support member at said clamp receiving portion, wherein said clamp receiving portion of said support member mechanically holds said clamping device in place before said clamping device is tightened.

17. The enclosure according to claim 13, further comprising:

a cover plate removably coupled to said housing, said cover plate covering an interior of said housing when said cover plate is coupled to said housing; and a sealing member coupled to said cover plate, said sealing member substantially sealing a gap between said cover plate and said housing.

18. The enclosure according to claim 13, further comprising a splitting device disposed in said housing, said splitting device capable of dividing power of a transmission medium.

19. The enclosure according to claim 13, wherein the distribution cable comprises an optical fiber distribution cable having at least one individual optical fiber strand as the transmission medium, and wherein said enclosure further comprises an optical splitter disposed in said housing, said optical splitter capable of dividing power of the transmission medium.

20. An enclosure for a transmission medium of a distribution cable and a drop line, said enclosure comprising:

a housing having an interior;

a first port in said housing, said first port providing a first opening having a first cross-sectional area to the interior of said housing;

a second port in said housing, said second port providing a second opening having a second cross-sectional area to the interior of said housing;

a removable, open drop plug comprising a concave-rounded end disposed in said second port and substantially sealing said second port while allowing a drop line to enter said housing through said second port;

a first strain relief device disposed in said housing and adjacent to said first port, said first strain relief device defining a first hole having a third cross-sectional area, and a second strain relief device disposed in said housing and adjacent to said second port, said second strain relief device defining a second hole having a fourth cross-sectional area, wherein the second cross-sectional area of the second opening is smaller than the first cross-sectional area of the first opening, and wherein the fourth cross-sectional area of the second hole is smaller than the third cross-sectional area of the first hole.

21. The enclosure according to claim 20, further comprising a third strain relief device disposed in said housing and adjacent to said first strain relief device, wherein said first and third strain relief devices form a two-stage strain relief system.

22. The enclosure according to claim 20, wherein said first strain relief device comprises a different type of strain relief device than said second strain relief device.

23. The enclosure according to claim 22, wherein said first strain relief device comprises a hose clamp, and wherein said second strain relief device comprises a plastic member that can be fastened back on itself.

24. The enclosure according to claim 20, further comprising a fiber management apparatus disposed in said housing, wherein said first and second openings of said first and second ports provide access from an exterior of said housing to said fiber management apparatus.

25. The enclosure according to claim 24, wherein said fiber management apparatus comprises a fiber splice tray.

26. The enclosure according to claim 20, further comprising a splitting device disposed in said housing, said splitting device capable of dividing power of a transmission medium.

27. The enclosure according to claim 26, wherein said splitting device comprises an optical splitter.

28. The enclosure according to claim 20, wherein said second strain relief device comprises:

a support member coupled to said housing, said support member having a clamp receiving portion comprising an opening leading from an edge of said support member to an interior of said support member; and a clamping device coupled to said support member at said clamp receiving portion, and wherein said clamp receiving portion of said support member mechanically holds said clamping device in place before said clamping device is tightened.

29. The enclosure according to claim 20, further comprising:

a cover plate coupled to said housing, said cover plate covering the interior of said housing; and a sealing member coupled to said cover plate, said sealing member substantially sealing a gap between said cover plate and said housing.

30. The enclosure according to claim 29, wherein said sealing member substantially seals the gap between said cover plate and said housing and a gap between said cover plate and said removable drop plug.

* * * * *

UNITED STATES PATENT AND TRADEMARK OFFICE
CERTIFICATE OF CORRECTION

PATENT NO. : 6,711,337 B2
DATED : March 23, 2004
INVENTOR(S) : Ronald L. Hodge et al.

It is certified that error appears in the above-identified patent and that said Letters Patent is hereby corrected as shown below:

Column 15,
Line 14, "scaling" should read -- sealing --.

Signed and Sealed this

Second Day of November, 2004

JON W. DUDAS
*Director of the United States Patent and Trademark Office*